United States Patent [19]

Paschal

[11] Patent Number: 4,755,789
[45] Date of Patent: Jul. 5, 1988

[54] LIFE BELT WARNING DEVICE

[76] Inventor: John Paschal, 35 Thomastown Rd., Minehill, N.J. 07801

[21] Appl. No.: 36,466

[22] Filed: Apr. 9, 1987

[51] Int. Cl.$^4$ .................. B60Q 1/00; G08B 25/02; G08B 23/00
[52] U.S. Cl. .................. 340/52 D; 340/692; 340/693
[58] Field of Search .................. 340/692, 52 D, 693, 340/52 R

[56] References Cited

U.S. PATENT DOCUMENTS

| | | | |
|---|---|---|---|
| 3,947,812 | 3/1976 | Lee et al. ........................ | 340/52 D |
| 4,345,242 | 8/1982 | Ienna-Balistreri ............. | 340/693 X |
| 4,432,563 | 2/1984 | Pitcher ........................... | 340/52 R X |

Primary Examiner—Glen R. Swann, III
Assistant Examiner—Thomas J. Mullen, Jr.
Attorney, Agent, or Firm—Thomas L. Adams

[57] ABSTRACT

A self contained device for installation in a vehicle which gives an audible message to remind the occupants to fasten their seat belt. The device includes circuitry for producing a synthesized voice message from a prerecorded ROM and announcing through a speaker. A strap is provided to enable the device to be easily installed under the dashboard of the vehicle. The device is powered from any vehicle source, such as from a cigarette lighter socket and is activated, in its normal mode, when the ignition or accessories are turned on. It is deactivated manually by pressing a normally open switch which is located remotely of the device. In another mode, the recorded message may be manually activated and deactivated by sequential pressings of the switch for warning passengers who have entered the vehicle after the engine has already been started.

3 Claims, 2 Drawing Sheets

LIFE BELT WARNING DEVICE

BACKGROUND OF THE INVENTION

The present invention relates to a seat belt warning system for an automobile, and in particular, to a system which provides an audible reminder that the seat belt has not been secured.

The use of a seat belt in an automobile as a means of preventing serious injury and death has been an undisputed fact since their first introduction. Since then, considerable energies have been focused on encouraging non-wearers to "Buckle-Up". These efforts have included extensive promotional campaigns, vehicle-installed warning buzzers and lights, passive restraint systems and even fines. Unfortunately, thousands of lives are still lost every year that could have been saved by buckled seat belts.

Many people simply forget to wear their seat belts. Vehicle-installed warning lights and buzzers were intended as reminders to otherwise forgetful passengers. These indicators were viewed by many motorists as annoyances and were, in many cases, disconnected, thereby defeating their purpose.

Known synthesized voice systems are now available and were largely well-received by most people. Telephone numbers are being given by synthesized voices; soda machines are suggesting different selections; and now virtually all car manufacturers offer automobiles with a synthesized voice to warn the motorist of various conditions, such as keys left in the ignition, low oil, and the like. More recently, the synthesized voice is being used to remind motorists to secure their seat belts. This approach is apparently better received and is resulting in a considerably greater number of motorists securing their seat belts.

While the use of synthesized voice systems for warning motorists to secure their seat belt has been proven successful and necessary, a problem exists with the millions of older vehicles on the roads today with systems which are inadequate, disconnected or non-existent.

Another consideration is that a driver may want to warn his passengers to buckle their seat belts well into their journey. Commercially available systems do not give the driver an opportunity to reannounce the warning to these delinquent passengers.

Accordingly, there exists a need for providing vehicles with the safety benefits of a voice-synthesized seat belt warning system, that has the ability to be operated at will.

SUMMARY OF THE INVENTION

In accordance with the illustrative embodiments demonstrating features and advantages of the present invention, there is provided a seat belt reminder device in a vehicle having one or more seat belts, a dashboard, a power source, an ignition switch, and an electrical outlet for an accessory such as a cigarette lighter. Accordingly, the outlet supplies power to the accessory when the ignition switch is turned on. The seat belt reminder device includes a housing and a support means for supporting the housing from a portion of the dashboard. Also included is a circuit means contained within the housing. This circuit means includes a speech synthesizer for generating an audible message reminding passengers in the vehicle to wear their seat belts. The device includes means to electrically interconnect the circuit means and the electrical outlet. Thus the speech synthesizer is activated to generate the audible message when the ignition switch is turned on. The reminder device also includes a normally open switch, electrically connected to said circuit means. The momentary closure of the switch will deactivate the speech synthesizer to halt the audible message, once the speech synthesizer has been activated by turning on the ignition switch. Thus the reminder device is entirely self contained and adapted to be manually installed in the vehicle.

The use of such a device will remind the driver to secure his seat belt the moment the ignition is turned on by giving a recorded message which could indicate the safety benefits, or the legal responsibility of such. A switch remote of the system would be pressed to deactivate the message. This switch, which could alternatively be used to activate the message, would be pressed when strangers which ride as passengers, do not secure their seat belts. This gives the system an advantage over the systems currently being installed in newer cars today since it gives the driver the ability to remind other passengers to secure their seat belt whether or not the ignition has been turned off and on again.

BRIEF DESCRIPTION OF THE DRAWINGS

The above summary of the invention as well as other objects, features and advantages of the present invention will be more fully appreciated by reference to the following detailed description of presently preferred, but nonetheless, illustrative embodiments in accordance with the present invention, when taken in conjunction with the accompanying drawings wherein.

DETAILED DESCRIPTION OF THE PREFERRED EMBODIMENT

Figure 1:
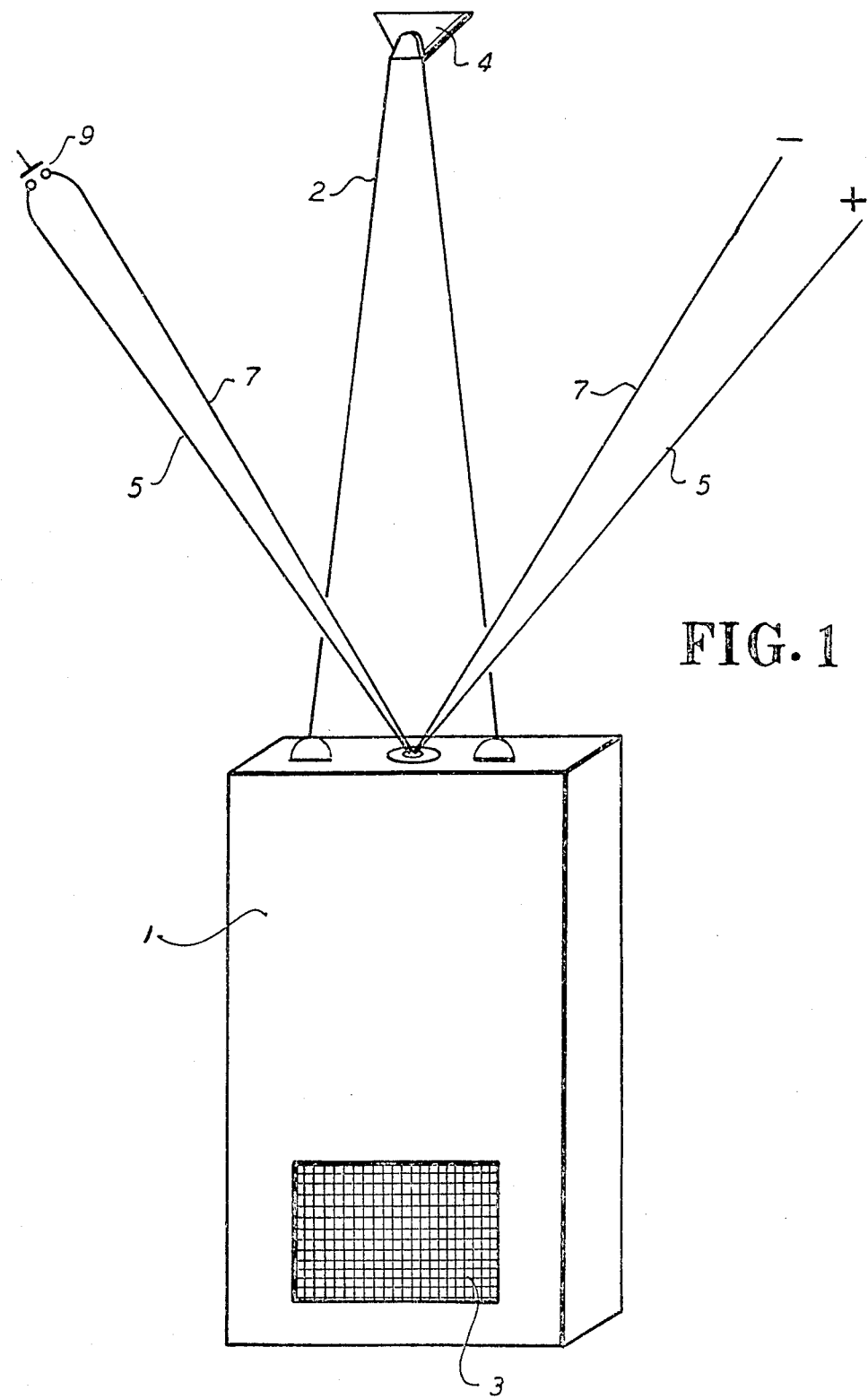
FIG. 1 is a front perspective view of the warning system device according to the present invention.

Referring to FIG. 1, the general overall structure of the device is shown with a housing 1 containing speaker 3 and circuitry (shown in other figures) for producing a voice message. A support means 2 for securing the housing 1 to the underside of the dashboard (not shown), or the like, is shown in this preferred embodiment as a plastic strap having clip 4 at one end for engaging a suitable support.

The system receives power from the vehicle through leads 5 and 7 which may terminate at their ends at an adaptor, for insertion within a cigarette lighter. Alternatively, leads 5 and 7 may be connected to the power lines of an accessory (not shown). Normally open switch 9 is remotely connected to the device and provides manual activation or deactivation of the message.

As previously stated, the system may be easily installed in a vehicle not equipped with such a warning device. Clip 4 may be attached to any appropriate structure under the dashboard and spaced apart from the housing 1 a sufficient distance to provide that the speaker will be free from obstructions, through the use of a securing means, or strap, of suitable length. Power leads 5 and 7 are attached to respective positive and negative connections within the vehicle, and would preferably be plugged into a cigarette lighter socket or into the power wiring of an accessory, such as a radio, heater, signal lights, etc. Line 5 is connected to any wire that supplies 12 V to an accessory such as the radio, heater, cigarette lighter, signal lights, etc. In this way the device is activated when the ignition or accessory switch (shown subsequently) is in the ON position, and deactivated when the ignition or accessory switch is in the OFF position. Line 7 is connected to any common ground.

Normally open switch 9 may take various forms, but should be easily operable by the driver. Switch 9 would be secured at a convenient, remote location and electrically connected to the device. This enables the owner, for example, to attach the device in the center of the dashboard where a floor hump typically obscures free space and mount the normally open switch 9 to the lower-left-hand portion of the dashboard for convenient reach. Switch 9 is an illuminated normally open momentary switch, which is approximately the size of a quarter and 3/16" thick, and glued to any location convenient to the driver.

The device is suspended by strap 2 to any convenient bracket or wire harness under the dashboard (not shown). The device is suspended high enough so as to allow only speaker 3 to be exposed and facing the occupants of the vehicle. The weight of the device is approximately six ounces. Size is approximately $4\frac{1}{4}" \times 2\frac{1}{2}" \times 1"$.

In normal operation, power is supplied to the device through the leads 5, 7 when the ignition is switch on, as, for example, when the car is started. Lines 5 and 7 are 20 gauge wire and approximately four feet long to provide enough length to mount switch 9 in any convenient location. A synthesized voice will begin to warn the driver to fasten his seat belt by repeating a message, i.e.: "PLEASE FASTEN YOUR SEAT BELT -YOUR SEAT BELT MAY SAVE YOU FROM INJURY OR EVEN YOUR LIFE—THE SEAT BELT LAW IS BEING ENFORCED." This message will continue to be repeated until the normally open switch 9 is pressed. The regular driver of the vehicle may press switch 9 before the message is fully announced. The circuitry provides that subsequent messages would, nonetheless, start at the beginning. In this normal mode, the single pressing of the normally open switch 9 will deactivate the device.

As is frequently the case when carrying passengers, others in the vehicle may forget to fasten their seat belts. This system provides an advantage over systems currently installed in vehicles today, by giving the driver the ability to activate the device whether or not the ignition has been switched off and back on. If, for example, a passenger enters the vehicle while the engine is already running, the driver may manually activate the device by pressing the normally open switch 9 once, to start the message. This switch 9 acts as a toggle to alternately turn the device on and off, so that once the new passenger has secured his seat belt, the switch may be pressed a second time to stop the message.

Figure 2:
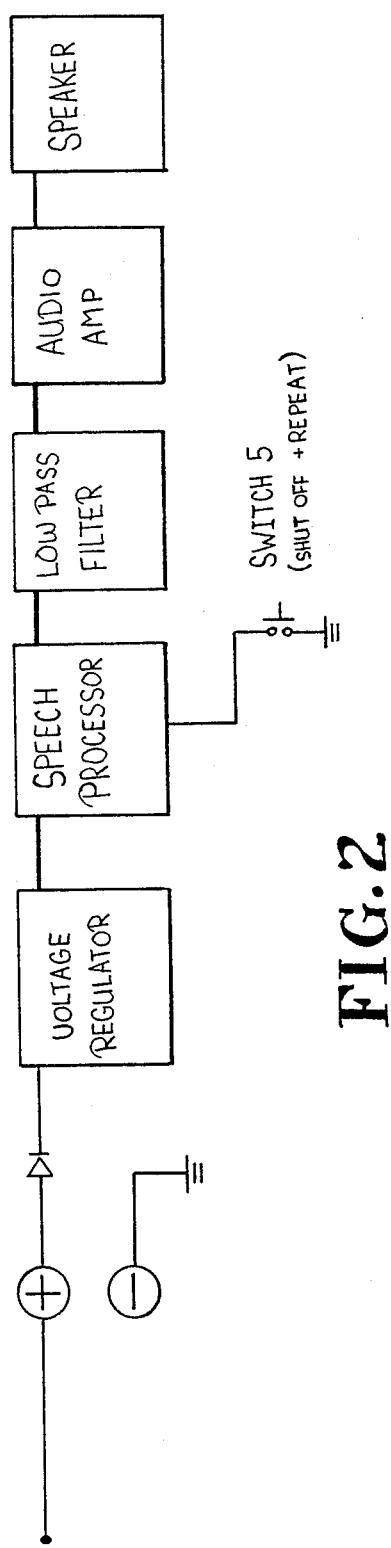
FIG. 2 illustrates the various circuits comprising the preferred embodiment in block form.

FIG. 2 illustrates the individual circuits of the preferred embodiment in block form, showing the voltage regulator 13 which converts the vehicle voltage to the needed working voltage and further protects the system from surges in power. A speech processor 15 is provided for creating the message and may take the form of a preprogrammed ROM. A low pass filter 17 sends this signal to the audio amplifier 19 for driving the speaker 3. The normally open switch 9 is connected to the speech processor 15 and provides manual activation or deactivation of the message. A diode 11 may be installed between the power source and the circuitry for protection against reverse voltage spikes which are known to occur in vehicle electrical systems.

It is to be appreciated that various modifications may be implemented with respect to the above preferred embodiment.

What is claimed is:

1. In a vehicle having one or more seat belts, a dashboard, a power source, a vehicle switch for accessories or ignition, and an electrical terminal for an accessory such as a cigarette lighter, whereby the terminal supplies power to the accessory when the vehicle switch is turned on, a seat belt reminder device comprising:
   a housing;
   a support means for supporting the housing from a portion of the dashboard;
   circuit means contained within said housing, said circuit means including a speech synthesizer for generating an audible message reminding passengers in the vehicle to wear said seat belts;
   means to electrically interconnect said circuit means and said electrical terminal, whereby said speech synthesizer is activated to generate said audible message when said vehicle switch is turned on; and
   a normally open switch electrically connected to said circuit means, the momentary closure of which will deactivate said speech synthesizer to halt said audible message, once said speech synthesizer has been activated by turning on said vehicle switch;
   whereby said reminder device is entirely self contained and adapted to be manually installed in said vehicle.

2. The device of claim 1 wherein, once said vehicle switch has been turned on, repetitive momentary closures of said normally open switch will alternatively deactivate and activate said speech synthesizer.

3. The device of claim 2 wherein turning off said vehicle switch at any given time will deactivate said speech synthesizer, regardless of whether said speech synthesizer is activated or deactivated at said time by said normally open switch.

* * * * *